United States Patent [19]

Ross et al.

[11] Patent Number: 4,961,995

[45] Date of Patent: Oct. 9, 1990

[54] POLISHABLE, FLAME RETARDED, SYNTHETIC MINERAL PRODUCT

[76] Inventors: Gilbert B. Ross, 12836 Arroyo, Sylmar, Calif. 91342; Lonnie F. Risley, 48371 Twin Pines Ranch Rd., Idyllwild, Calif. 92324

[21] Appl. No.: 389,741

[22] Filed: Aug. 4, 1989

Related U.S. Application Data

[63] Continuation of Ser. No. 83,716, Aug. 10, 1987, abandoned.

[51] Int. Cl.$^5$ ............... B32B 17/00; C09K 21/00; C08K 3/10; A47G 35/00
[52] U.S. Cl. .................. 428/409; 252/601; 252/609; 252/602; 428/15; 428/327; 428/329; 428/407; 428/482; 428/920; 428/921; 428/147; 428/542.2; 428/913.3; 523/171; 524/437; 524/447; 524/445; 524/449; 52/315; 52/311
[58] Field of Search ............... 252/601, 602, 610, 611, 252/609; 523/171, 500; 524/539, 447, 449, 437, 452, 494; 525/25, 28, 29, 30, 31, 32; 52/311, 315; 428/15, 220, 542.2, 920, 921, 913.3, 532, 409, 327, 410, 35, 329, 325, 431, 482; 427/288, 204; 106/93; 264/330, 331.11, 331.15

[56] References Cited

U.S. PATENT DOCUMENTS

| | | | |
|---|---|---|---|
| 2,265,226 | 12/1941 | Clewell et al. | 138/177 |
| 2,761,176 | 9/1956 | Welch et al. | 264/77 |
| 3,663,493 | 5/1972 | Miller | 524/461 |
| 3,692,892 | 9/1972 | Lemelson | 264/317 |
| 3,767,759 | 10/1973 | Wichterle et al. | 264/313 |
| 3,827,933 | 8/1974 | Duggins et al. | 264/331.18 |
| 4,076,540 | 2/1978 | Stossel | 428/532 |
| 4,085,246 | 4/1978 | Buser et al. | 524/437 |
| 4,159,301 | 6/1979 | Buser et al. | 524/451 |
| 4,235,948 | 11/1980 | Holmes | 428/15 |
| 4,433,070 | 2/1984 | Ross et al. | 524/539 |
| 4,446,177 | 5/1984 | Munoz et al. | 428/15 |
| 4,734,302 | 3/1988 | Baskin | 428/15 |

FOREIGN PATENT DOCUMENTS

| | | |
|---|---|---|
| 1221781 | 7/1966 | Fed. Rep. of Germany . |
| 1376985 | 9/1964 | France . |
| 1403046 | 5/1965 | France . |
| 62-20894 | 2/1984 | Japan . |

*Primary Examiner*—Howard J. Locker
*Attorney, Agent, or Firm*—Louis J. Bachand

[57] ABSTRACT

Synthetic mineral compositions, methods and articles are provided in which both high polishability and flame retardancy are achieved, by encasing a particulate flame retardant such as alumina trihydrate with a resin having like polishing characteristics to the synthetic organic polymers of the synthetic mineral.

27 Claims, No Drawings

POLISHABLE, FLAME RETARDED, SYNTHETIC MINERAL PRODUCT

This application is a continuation of application Ser. No. 07/083,716, filed Aug. 10, 1987, now abandoned.

Technical Field

This invention relates to syhthetic organic polymer compositions, and particularly to synthetic mineral appearing polymer compositions which have a need for flame retardancy and at the same must be polishable to a high lustre. In its various aspects the invention concerns compositions, articles of manufacture and methods of making compositions and articles, particularly of the mineral appearing type, such as synthetic granite. Synthetic granite products find widespread application in the architectural field, as wall panels, counters, tables, tubs and vanities. In interior uses, flame resistance is a desired and often required attribute. Accordingly, the present compositions are flame retarded to industry standards, but unlike previously known flame retarded synthetic mineral articles, the present products are highly polishable, despite the inclusion of flame retarding particulate.

BACKGROUND

Synthetic mineral compositions are well known. U.S. Pat. No. 4,433,070 to Ross and Stevens first disclosed such compositions having the advantage of polishability by virtue of using a resinous filler in a resin matrix of like hardness, rather than the then common inorganic fillers which were difficult to distribute properly and adversely affected polishing qualities. Other patents have disclosed conventional systems of acrylic resin with various fillers as synthetic mineral simulative compositions, e.g. U.S. Pat. No. 3,663,493 to Miller, and patents therein described, and U.S. Pat. Nos. 4,085,246 and 4,159,301 both to Buser et al which disclose in addition to acrylic resin matricies a variety of other polymers, including polyesters, which are filled with a blend of microscopic fillers and macroscopic translucent or transparent particles for an asserted granite effect. Brit. No. 1,174,952 to Majnoni disclosed buttons formed of polyester matrix and polyester scrap solids to produce what can be described as a variegated effect.

Other patents in the field include those to Duggins: U.S. Pat. Nos. 3,827,933 and 3,847,865 which teach filled acrylic polymers particularly, and containing alumina trihydrate. In the Duggins patents it is pointed out that the use of alumina trihydrate filler as a flame retardant in polyester resins was taught in a Connolly and Thornton article in *Modern Plastics* 43, 154 (1965).

Neglected in the development of the art has been the combining of flame retardancy with polishability. Hitherto disclosed compositions have had either the polishability of the Ross and Stevens product, or the flame retardancy of the acrylic products, but not both in one product.

SUMMARY OF THE INVENTION

It is accordingly an object of the present invention to provide a synthetic mineral product having both poilshability and flame retardancy. It is another object to provide composition and method for the manufacture of synthetic mineral simulative compositions in which polishability is preserved despite the inclusion of ingredients, such as hard mineral materials in particulate form, normally inimical to obtention of a highly polished surface. Another object is to provide a method of ameliorating the roughening effect of included mineral particulates in synthetic organic polymer compositions, for higher polishability and other purposes. Another object of the invention is to moderate the gravity sinking effect of flame retarding additives such as alumina trihydrate so that good distribution is obtained in the product. Yet another object is to make invisible the presence of alumina trihydrate because its optical effect is esthetically undesirable in many synthetic mineral compositions. Still other objects will appear hereinafter.

In accordance with the invention, these and other objects are realized in methods, compositions and articles in which the resin modifier, such as a flame retarding particulate like alumina trihydrate, is encased in a resin like the matrix resin before addition thereto, so that e.g. the polishability or other desired, but normally adversely affected, quality perdures in the product, the encasing resin being like to the matrix resin in the desired quality, so that the normally adversive surface or optical effect of the additive is masked, but the desirably contributed attribute, such as flame retardancy nonetheless made available.

In its particular aspects, the invention provides a polishable, flame retarded, synthetic mineral product comprising a resin matrix, a particulate resinous filler distributed therein in a manner simulative of natural mineral markings, the matrix and filler having like polishing characteristics for a uniform gloss after polishing; and a flame retardant in a flame-retarding effective amount, the flame retardant being harder and of different polishing characteristics than the matrix and normally tending to interfere with surface polishing to uniform gloss of the product, the flame retardant being completely encased within the filler particles in a manner blocking surface exposure of the flame retardant, whereby the product surface is polishable to a uniform gloss.

In this and like embodiments: the resin matrix comprises a synthetic organic polymer; the resinous filler comprises a synthetic organic polymer; the flame retardant comprises a material, e.g. an inorganic compound, such as alumina trihydrate less combustible than the resinous matrix; the product comprises from 20 to 90 weight percent resin matrix; the product comprises from 80 to 10 weight percent resinous filler; the filler comprises up to 80 percent by volume flame retardant; the product comprises from 45 to 70 weight percent resin matrix, from 30 to 55 weight percent resinous filler comprising from 30 to 70 percent by volume flame retardant; the matrix comprises polyester resin or an acrylic polymer; and/or, the resinous filler comprises polyester resin or acrylic polymer.

In another embodiment the invention provides a polishable, flame retarded, hard surface architectural article, such as a decorative or functional hard surface or covering for walls, tables, countertops and bars, comprising a synthetic organic resin matrix and a flame retarding effective amount of flame retardant particles, the particles having a resinous casing separately formed outside of the matrix against exposure of the particles within the matrix, the resinous casing having like polishing characteristics to the matrix, whereby the article has a uniformly polishable surface.

Preferably, the article comprises from 45 to 70 weight percent synthetic organic resin matrix, and sufficient resinous filler to completely encase the flame retardant, e.g. from 30 to 55 weight percent resinous filler comprising from 30 to 70 percent by volume flame retardant; the flame retardant is inorganic; the matrix comprises polyester resin or an acrylic polymer; the resinous particulate filler comprises polyester resin or an acrylic polymer; and the inorganic flame retardant comprises alumina trihydrate.

In others aspects, the invention provides a method of flame retarding a composition comprising a resinous matrix and a particulate resin filler having like polishing characteristics, including combining the matrix and filler and adding a flame retarding effective amount of a flame retardant encased in the resin of said filler, the filler resin having like polishing characteristics to the matrix resin.

Herein, as in like embodiments, the invention contemplates selecting a polyester resin or an acrylic polymer as the resin matrix; selecting a polyester resin or an acrylic polymer as the resinous filler; selecting a polyester resin or an acrylic polymer to encase the flame retardant; selecting a polyester resin or an acrylic polymer as the resin matrix and as the resinous filler; selecting an inorganic material as the flame retardant; and selecting alumina trihydrate as the inorganic material flame retardant.

In yet another embodiment there is provided a method of manufacturing architectural articles of synthetic organic polymer which articles are flame retarded by an additive particulate material and surface polishable, including encasing the flame retardant additive in a synthetic organic polymer, adding to the article polymer, and shaping into the article.

As in other embodiments, in this embodiment there is further included selecting a polyester resin or acrylic polymer as the synthetic organic polymer; selecting a polyester resin or an acrylic polymer to encase the flame retardant; selecting an inorganic material as the flame retardant; and selecting alumina trihydrate as the inorganic material flame retardant.

More broadly, the invention provides a method of selectively modifying the properties of a composition comprising a synthetic organic polymer matrix, including combining said polymer matrix and a property modifying effective amount of a modifying agent durably encased in a synthetic organic polymer having those properties of said matrix which it is desired to not modify with said modifying agent and no properties interfering with desired property modification by said modifying agent, wherein the invention typically further includes selecting a polyester resin or an acrylic polymer as the polymer matrix, an inorganic flame retardant as the modifying agent, and a polyester resin or an acrylic polymer as the agent encasing polymer.

In composition terms, there is provided in accord with the broader aspects of the invention, the composition comprising a synthetic organic polymer matrix, e.g. of polyester resin or acrylic polymer, and a property modifying effective amount of a modifying agent, such as a flame retarding amount of alumina trihydrate, durably encased in a synthetic organic polymer, such as those mentioned, having those properties of the matrix which it is desired not to modify with the modifying agent and no properties interfering with desired property modification by the modifying agent.

DETAILED DESCRIPTION

The present invention uses a polymeric coating on the flame retardant or other additive to ensure that at the surface of the final article made from the composition, the desired properties available from the polymer matrix and filler if any are also available where the additive may be at the surface. The filler resin is most conveniently used, and the additive encased in the filler resin added as or in lieu of filler.

The resins and polymers used in the invention are all well known per se, see for example the descriptions of resins and polymers in the patents cited above, the disclosures of which are incorporated herein by this reference, to avoid unduly lengthening the present specification by describing these well known materials. Broadly, useful matrix and filler resins and polymers are those synthetic organic polymeric materials which in the case of the matrix resins and polymers can be extruded, hot melt distributed, cast or poured per se or in solution to subsequently solidify by freezing or evaporation of solvent.

In the case of additive-free filler polymers the matrix polymers can be used broken up or ground to the desired size, e.g. 25 to 600 and up 750 microns and more average particle size, or particulates made from these and like resins directly can be used. For purposes of the present invention the properties of interest in the finished article, such as uniform polishability, must be kept in mind in making the resin and polymer selections, and selections of polymers for matrix and filler having similar or identical values in the desired property will be most satisfactory. Where the critical properties do not require such values in the matrix and filler materials, the range of choice of polymer material can be broadened.

Preferred polymers are the polyesters, a class of resinous materials which broadly are derived from glycols and unsaturated acids or anhydrides, e.g. maleic anhydride or phthalic anhydride and propylene glycol, and dissolved in styrene or methyl methacrylate. Also preferred are acrylic polymers, particularly polymethyl methacrylate and in a methyl methyacrylate solvent.

The nonadversive introduction of an additive such as a flame retardant into the above polymer compositions is the main desideratum of the present invention. Flame retardancy is accomplished best by incorporating an additive which releases water or directly a gas that inhibits propagation of flame, e.g. $CO_2$, but may be accomplished passively by reducing the combustability of the architectural articles. This latter effect is realized by inclusion of any material which is less combustible that the polymer it replaces, and thus glass, carbon, graphite, phenolics, silicas, clays, and all naturally occuring minerals less combustible than the organic polymers of the compositions may be used as the additive to be flame retardants herein. Alumina trihydrate has been recognized as a superior flame retardant for synthetic mineral simulative systems in the past and is so recognized in the present systems, for its effect of releasing its waters of hydration upon being heated which multiplies its quenching efficiency beyond mere incombustability.

Modifying agent additives, organic or inorganic, which are lower or not effective in flame retardancy are still advantageously used in the present compositions for special purposes inherent in a given material, or simply for lowering cost. Previously, the use of such materials was inhibited where polishability was an important consideration, since the nonuniformity between the additive and the matrix polymer gave rise to uneven buffing results at and near the additive particles, and an overall matte effect rather than a polished lustre. This is the result of myriad small projections of additive at the surface where the polymer has been selectively worn away by polishing and the additive has not. With the present invention however, the additive is not exposed at the surface, but only the additive encasement which as described is like to the matrix and/ or nonadditive filler so as to be equally or nearly equally polishable in contradistinction to the encapsulated additve modifying agent. The term "polishability" herein refers to the quality of assuming an added lustre upon buffing with or without use of lustrants and buffing aids, and "like polishability" refers to a like response to buffing, side by side, of two discrete phases in both lustre and wear, such that surface discontinuities between phases are not increased by buffing. Hard additive phases such as alumina trihydrate are quickly raised relative to the surrounding matrix by buffing as the matrix wears faster than the additive and matte not lustre effects are realized.

In preparing the compositions of the present invention, the modifying agent containing filler particulate is first prepared by taking, for example, alumina trihydrate of very fine particle size and mixing with the filler resin, e.g. a solution of polyester resin in styrene. The alumina trihydrate and resin solution are blended together until the each individual particle of the additive is well coated. The resin is then cured. The cured resin mass is ground by any suitable means to the desired particle size of the particulate resin filler, e.g. 25 to 600 microns in average particle size. Inspection of the alumina trihydrate filled filler particles reveals that the alumina trihydrate particles are individually encased by the resin, the particles being at the center of a resin coating, such that the particles are from 30 to 70 percent by volume of the individual filler particulates. The encased particles are not to be confused with dyes and pigments which are incorporated in resins, including particulate resins. The present additives added for flame retardant effects are encased by and not incorporated into the surrounding resin. The presence of a particle in the filler resin does not color the resin, but rather the filler resin masks the particle appearance, including color. This is especially desirable where the particles are alumina trihydrate flame retardant. This material has a tendency to obtrude into the achievement of optimum natural mineral effects, but in the present invention its optical effects are swallowed up in the encasing of it and what appears to the observer on looking into the depth of surface of the synthetic mineral product is only the filler particle, with no visible sign of the alumina trihydrate.

Once prepared the filled filler particulate is added to the matrix resin in the above stated proportions. It has been noted that the effectively increased size of the additive, through having the resin coating in forming the filler particulate, increases displacement and decreases the sink rate of the additive in the matrix resin, making blending and maintaining mineral simulative distribution of particulate uniformly in the product readily obtainable, in contrast to complex mixing schemes used in the prior art.

The matrix is then cured or otherwise allowed to harden in the usual manner.

EXAMPLES

A simulated mineral article was prepared by adding to a vessel equipped with blending devices a mass of polyester resin in styrene solution and alumina trihydrate in a mix of sizes from 2 to 4 microns. The mix was blended for less than one hour and until the individual component alumina trihydrate particles were each coated. The mix was poured out, allowed to cure, and then ground over a range less than 600 microns in average particle size. Inspection of specimens of the particulate will reveal a center of alumina trihydrate equalling typically about 60% by volume of the overall particulate and ranging generally in the 30 to 70% by volume range.

Forty parts of the just prepared resinous particulate with the alumina trihydrate encased therein were combined in a suitable vessel with 60 parts of the same polyester resin, per 100 parts by weight of the combination.

After stirring together to a uniform blend, the matrix and filler resin was poured out into elongated horizontal forms for cure. The combination can of course be poured into molds of desired configuration as an alternative to the making of sheets.

A sample of the cured section was cut from the remainder for evaluation. Inspection revealed that the alumina trihydrate was not visible, nor was there any yellowing of the resin characteristic of an exposed trihydrate additions. Cutting with a saw was a smooth trouble-free operation. Sanding with a finishing sander to develop a rounded edge went easily and the resulting edge was smooth, polished and free of matte-causing projections.

The product was evaluated for flame retardance and was qualified for a Class I rating.

Accordingly the above objects of providing a flame retarded product simulative of natural mineral and polishable as well has been realized.

What is claimed is:

1. A polishable, flame retarded, synthetic mineral product comprising a resin matrix, a particulate resinous filler distributed therein in a manner simulative of natural mineral markings, said matrix and filler having like polishing characteristics for a uniform gloss after polishing: and a flame retardant which is harder and of different polishing characteristics than said matrix and normally tends to interfere with surface polishing of said product to uniform gloss, said flame retardant being first covered with a coating of said filler resin which is then cured separately for said matrix, and thereafter said coated flame retardant is added as filler particles into said matrix and the said flame retardant, whereby said product surface is polishable to a uniform gloss.

2. Polishable, flame retarded, synthetic mineral product according to claim 1, in which said resin matrix comprises a synthetic organic polymer.

3. Polishable, flame retarded, synthetic mineral product according to claim 1, in which said resinous filler comprises a synthetic organic polymer.

4. Polishable, flame retarded, synthetic mineral product according to claim 1, in which said flame retardant comprises a material less combustible than said resinous matrix.

5. Polishable, flame retarded, synthetic mineral product according to claim 1, in which said flame retardant comprises an inorganic compounds less combustible than said matrix.

6. Polishable, flame retarded, synthetic mineral product according to claim 5, in which said inorganic compound is alumina trihydrate.

7. Polishable, flame retarded, synthetic mineral product according to claim 1, in which said product comprises from 20 to 90 weight percent resin matrix.

8. Polishable, flame retarded, synthetic mineral product according to claim 1, in which said product comprises from up to 80 to 10 weight percent resinous filler.

9. Polishable, flame retarded, synthetic mineral product according to claim 1, in which said filler comprises up to 80 percent by volume flame retardant.

10. Polishable, flame retarded, synthetic mineral product according to claim 1, in which said product comprises from 45 to 70 weight percent resin matrix, from 30 to 55 weight percent resinous filler comprising from 30 to 70 percent by volume flame retardant.

11. Polishable, flame retarded, synthetic mineral product according to claim 10, in which said flame retardant is inorganic.

12. Polishable, flame retarded, synthetic mineral product according to claim 11, in which said flame retardant is alumina trihydrate.

13. Polishable, flame retarded, synthetic mineral product according to claim 11, in which said matrix comprises polyester resin.

14. Polishable, flame retarded, synthetic mineral product according to claim 11, in which said matrix comprises acrylic polmer.

15. Polishable, flame retarded, synthetic mineral product according to claim 11, in which said resinous filler comprises polyester resin.

16. Polishable, flame retarded, synthetic mineral product according to claim 11, in which said resinous filler comprises acrylic polmer.

17. Polishable, flame retarded, synthetic mineral product according to claim 15, in which said matrix comprises polyester resin or acrylic polymer.

18. Polishable, flame retarded, synthetic mineral product according to claim 17, in which said inorganic flame retardant comprises alumina trihydrate.

19. A polishable, flame retarded, hard surface architectural article comprising a synthetic organic resin matrix and a flame retarding effective amount of flame retardant and resin, whereby said flame retardant is added into said matrix, as particles having a coating of said resin, said coating being separately formed from said matrix by curing said particle-coating resin outside of said matrix, and thereafter adding said particles into said matrix, said resin coating said flame retardant particles against polish-interfering exposure of said particles within said matrix, said resin coating having like polishing characteristics to said matrix, whereby said article has a uniformly polishable surface.

20. The polishable article of claim 19, in which said article comprises from 45 to 70 weight percent synthetic organic resin, and from 30 to 55 weight percent resinous filler comprising from 30 to 70 percent by volume flame retardant.

21. The polishable, flame article of claim 20, in which said flame retardant is inorganic.

22. The polishable article of claim 21, in which said matrix comprises polyester resin.

23. The polishable article of claim 21, in which said matrix comprises acrylic polymer.

24. The polishable article of claim 21, in which said particulate filler coating comprises polyester resin.

25. The polishable article of claim 21, in which said particulate filler coating comprises acrylic polymer.

26. The polishable article of claim 25, in which said matrix comprises polyester resin or acrylic polymer.

27. The polishable article of claim 26, in which said inorganic flame retardant comprises alumina trihydrate.

* * * * *